(12) United States Patent
Upton (10) Patent No.: US 9,372,881 B1
(45) Date of Patent: Jun. 21, 2016

(54) SYSTEM FOR IDENTIFYING A CORRESPONDENCE BETWEEN A COBOL COPYBOOK OR PL/1 INCLUDE FILE AND A VSAM OR SEQUENTIAL DATASET

(71) Applicant: International Business Machines Corporation, Armonk, NY (US)

(72) Inventor: Gregg A. Upton, Santa Clara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/982,400

(22) Filed: Dec. 29, 2015

(51) Int. Cl.
*G06F 7/00* (2006.01)
*G06F 17/30* (2006.01)

(52) U.S. Cl.
CPC .... *G06F 17/30371* (2013.01); *G06F 17/30908* (2013.01)

(58) Field of Classification Search
CPC .................. G06F 17/30061; G06F 17/30286; G06F 17/30371; G06F 17/30908
USPC .......... 707/705, 755, 756, 778, 791, 793, 795
See application file for complete search history.

(56) References Cited

U.S. PATENT DOCUMENTS

| | | | | |
|---|---|---|---|---|
| 5,432,930 | A * | 7/1995 | Song | G06F 17/30404 |
| 6,356,285 | B1 | 3/2002 | Burkwald et al. | |
| 6,442,485 | B2 * | 8/2002 | Evans | G08G 1/205 340/436 |
| 6,480,918 | B1 * | 11/2002 | McKenney | G06F 9/526 710/200 |
| 6,570,564 | B1 * | 5/2003 | Sowizral | G06T 15/005 345/420 |
| 6,915,487 | B2 | 7/2005 | Costigan, Jr. et al. | |
| 7,061,486 | B2 * | 6/2006 | Sowizral | G06T 15/005 345/420 |
| 7,162,483 | B2 | 1/2007 | Friman | |
| 7,228,240 | B2 * | 6/2007 | Duron | G01M 5/0066 340/870.11 |
| 7,519,603 | B2 * | 4/2009 | Parker | |

(Continued)

FOREIGN PATENT DOCUMENTS

| | | |
|---|---|---|
| EP | 0753819 A1 | 1/1997 |
| EP | 2557499 A1 | 2/2013 |

(Continued)

OTHER PUBLICATIONS

Cosentino et al., "Extracting Business Rules from COBOL: A Model-Based Framework," WCRE, 2013, pp. 409-416.

(Continued)

*Primary Examiner* — Daniel Kuddus
(74) *Attorney, Agent, or Firm* — Weitzman Law Offices, LLC (57) ABSTRACT

A computer system for matching format defining data structures with at least one data-containing structure of a group of potentially corresponding data-containing structures is disclosed. The system is made up of at least one processor, non-volatile storage, multiple data-containing structures and multiple format defining data structures. The processor will analyze attributes of at least some of the data-containing structures according to a set of validation rules to identify a set of potential candidate format defining data structures for potentially corresponding to the data-containing structures, analyze at least some of the multiple format defining data structures according to at least one of the validation rules to identify a set of candidate data-containing structures containing data elements having formats substantially corresponding to at least one of the format defining data structures, and rank the set based upon correspondence between one or more of data types or values.

1 Claim, 8 Drawing Sheets

(56) References Cited

U.S. PATENT DOCUMENTS

| | | |
|---|---|---|
| 8,121,976 B2 | 2/2012 | Kalia et al. |
| 8,140,320 B2 | 3/2012 | Dangeville et al. |
| 8,326,963 B2 | 12/2012 | Moussallam et al. |
| 8,756,258 B2 | 6/2014 | Mazo |
| 8,880,468 B2 * | 11/2014 | Koponen ............ H04L 12/4633 707/634 |
| 8,898,635 B2 | 11/2014 | Mehalingam |
| 9,053,099 B2 | 6/2015 | Harman et al. |
| 9,152,387 B2 | 10/2015 | Jesurum |
| 2001/0030647 A1 * | 10/2001 | Sowizral ............... G06T 15/005 345/420 |
| 2001/0051853 A1 * | 12/2001 | Evans .................... G08G 1/205 701/301 |
| 2003/0030822 A1 * | 2/2003 | Finarov .............. G01B 11/0616 356/636 |
| 2010/0042959 A1 * | 2/2010 | Bhinge ................ G06F 11/263 716/136 |
| 2011/0153667 A1 * | 6/2011 | Parmenter ......... G06F 17/30371 707/780 |
| 2012/0151437 A1 | 6/2012 | Kneisel et al. |
| 2013/0042221 A1 | 2/2013 | Mehalingam |
| 2015/0193243 A1 | 7/2015 | Varkhedi et al. |
| 2015/0278272 A1 | 10/2015 | Cai et al. |

FOREIGN PATENT DOCUMENTS

| | | |
|---|---|---|
| JP | 2010534030 A | 10/2010 |
| JP | 2013508767 A | 3/2013 |
| JP | 2013225142 A | 10/2013 |
| JP | 2014505898 A | 3/2014 |
| JP | 5543640 B2 | 5/2014 |
| WO | 0242910 A1 | 5/2002 |

OTHER PUBLICATIONS

Aeschlimann et al., "Analyzing PL/1 Legacy Ecosystems: An Experience Report," WCRE, 2013, pp. 441-448.

* cited by examiner

FIG. 1

Layout1    202

```
01    EMPLOYEE-LAYOUT1
      05  EMPID              PIC 9(9).
      05  ENAME              PIC X(20).
      05  PHONE              PIC 9(6)   COMP-3.
      05  EXTENSION          PIC 9(4)   COMP-3.
```

Layout2    204

```
01    EMPLOYEE-LAYOUT2
      05  EMPID              PIC 9(9).
      05  ENAME              PIC X(20).
      05  JOBID              PIC 9(5).
      05  DEPTID             PIC 9(4).
      05  DEPARTMENT         PIC X(20).
```

Layout3    206

```
01    EMPLOYEE-LAYOUT3
      05  EMPID              PIC 9(9).
      05  ENAME              PIC X(20).
      05  ADDRESS            PIC X(30).
      05  ZIP                PIC X(5).
```

SYSTEM FOR IDENTIFYING A CORRESPONDENCE BETWEEN A COBOL COPYBOOK OR PL/1 INCLUDE FILE AND A VSAM OR SEQUENTIAL DATASET

FIELD OF THE INVENTION

This disclosure relates generally to computer systems and, more particularly, computer systems containing computer COBOL copybooks or PL/1 include files and Virtual Storage Access Method (VSAM) data or sequential data sets.

BACKGROUND

Many medium or large scale organizations have legacy systems containing tens to hundreds of thousands of VSAM or sequential data files that are accessed/maintained by COBOL or PL/1 programs. With these types of files, the contents layout is not specified in the file or self evident. Rather, the layout is separately defined in some COBOL copy book or PL/1 "include" file. Unfortunately, these kinds of file systems lack any kind of metadata catalog or repository, so there is no definitive link between any data-containing file and the layout(s) that can be used to the data-containing file contents, which effectively makes the contents very difficult to access.

Nevertheless, such data-containing files can potentially contain information that is valuable to the organization but, since their contents are not easily accessible and the current cost of identifying what may be contained in even a single one is relatively high, most organizations ignore these files as potential sources of insight. Compounding the problem is that there is no easy way to discern which files contain nothing of interest, which contain information that must be retained due to regulatory requirements, and which may contain sensitive or valuable information, so the sheer numbers make even attempting to find out prohibitive. While data virtualization tools like IBM® InfoSphere™ Classic Federation Server for z/OS® are useful in performing an iterative mapping process to attempt to match such files in cases where only a few files need to be matched, that process is tedious, time consuming and does not scale to cases where even hundreds, let alone thousands, or hundreds of thousands of such files—a not uncommon situation for some organizations.

Thus, there is an ongoing technological problem involving being able to match format defining data structures with data-containing structures when large numbers of both are involved.

SUMMARY

This disclosure describes a computer system that can be used to match format defining data structures with data-containing structures when large numbers of both are involved in a way that is automated, cost effective and can be used with large numbers of files.

One aspect of this disclosure involves a computer system for matching format defining data structures with at least one data-containing structure of a group of potentially corresponding data-containing structures. The system includes at least one processor, non-volatile storage accessible by the at least one processor, multiple data-containing structures, comprising one of VSAM data structures or sequential data sets, non-transiently stored within the non-volatile storage having no specifically identifiable corresponding data structures defining formats for properly accessing data contained within the multiple data-containing structures. The system also includes, multiple format defining data structures, comprising one or more COBOL copybooks or PL/1 include files, non-transiently stored within the non-volatile storage, the format defining data structures each including metadata definitions for at least one data-containing structure but not specifically identifiable as corresponding to any particular data-containing structure. The system further includes program instructions, non-transiently stored within non-volatile program storage, executable by the at least one processor of the computer system, which, when executed, will cause the at least one processor to: analyze attributes of at least some of the data-containing structures according to a set of validation rules to identify a set of potential candidate format defining data structures for potentially corresponding to the data-containing structures; analyze at least some of the multiple format defining data structures according to at least one of the validation rules to identify a set of candidate data-containing structures containing data elements having formats substantially corresponding to at least one of the format defining data structures; and rank the set based upon correspondence between one or more of i) data types within the set of candidate data-containing structures and data types identified within the at least some of the multiple format defining data structures, or ii) values contained within the set of candidate data-containing structures and definitions within the at least some of the multiple format defining data structures, to obtain a ranked set of candidate data-containing structures that may correspond to at least one of the format defining data structures; and thereby identify at least one of the format defining data structures that can be used to access at least one of the data-containing structures to obtain valid data therefrom.

The foregoing and following outlines rather generally describe the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This disclosure provides a technical solution to address the aforementioned problems inherent with attempting to match the format defining COBOL copybooks or PL/1 include files with data-containing VSAM data structures or sequential data files.

At the outset, it is noted that, as used herein, unless otherwise expressly stated, any reference to "storage" that stores format defining data structures, data-containing structures, and program instructions shall be understood to do so in a non-transitory manner, for example, such as non-transient solid state memory, a magnetic hard drive, a CD or DVD, a tape drive, or an analogous or equivalent storage medium type would. Likewise, the use of the phrase "VSAM data structures" is intended to mean the logical datasets for storing records in VSAM and may be interchangeably referred to herein as VSAM data sets.

Figure 1:
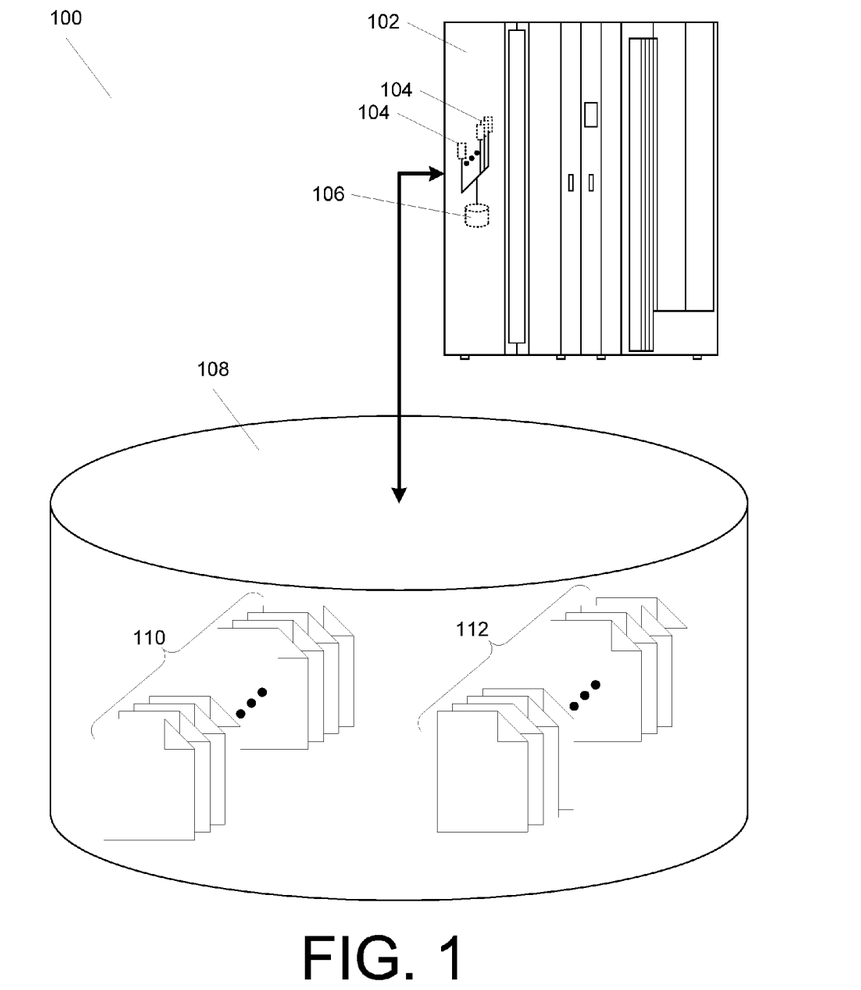
FIG. 1 illustrates, in simplified form, one example of a computer system implementing the approach described herein.

FIG. 1 illustrates, in simplified form, one example of a computer system 100 implementing the approach described herein. As shown, the system is made up of a computer 102 having at least one, and likely more, processor(s) 104 coupled to non-volatile program storage 106 that non-transiently stores program instructions that can be executed by the processor(s) 104 to effect the operation described herein.

The system further includes non-volatile storage 108 that has multiple data-containing structures 110, for example, VSAM data structures or sequential data sets, non-transiently stored therein in known manner. As noted above with respect to the problem addressed herein, such VSAM data structures or sequential data sets, by their nature, have no information specifically identifying any data structure(s) that define the formats needed to properly access the data contained in such data-containing structures 110, although the file system maintains the record lengths within each.

The non-volatile storage 108 additionally has stored therein multiple format defining data structures 112, for example, COBOL copybooks or PL/1 "include" files. Those format defining data structures 112 each include metadata for at least one data-containing structure. As noted above however, with respect to the problem addressed herein, the format defining data structures 112 are also not specifically identifiable to any particular one or more of the data-containing structures 110.

Figure 2:
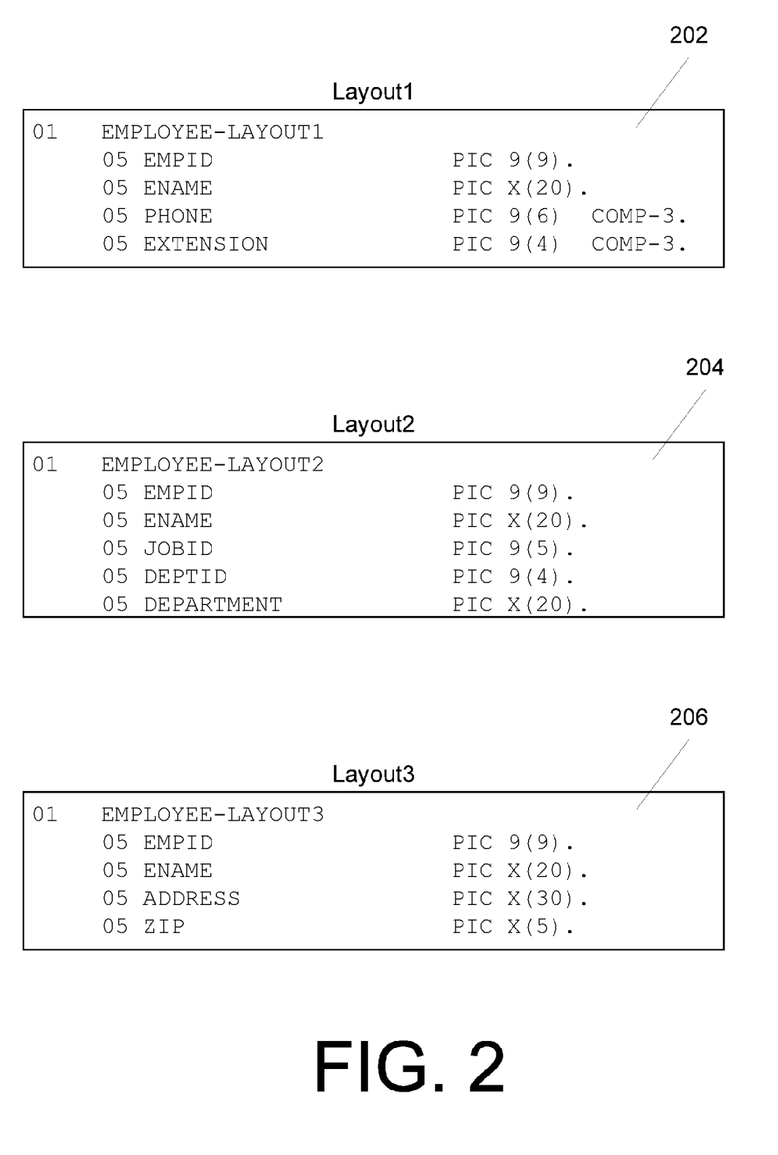
FIG. 2 illustrates, in simplified form, examples of three rudimentary format defining data structures.

FIG. 2 illustrates, in simplified form, examples of three rudimentary examples 202, 204, 206 of format defining data structures 112, respectively named "Layout1," "Layout2" and "Layout2" that, for purposes of example and understanding, are presumed to be present in the system 100 and define format needed for accessing data contained in some data-containing structure 110 that may, or may not, be present in the storage 108.

Figure 3:
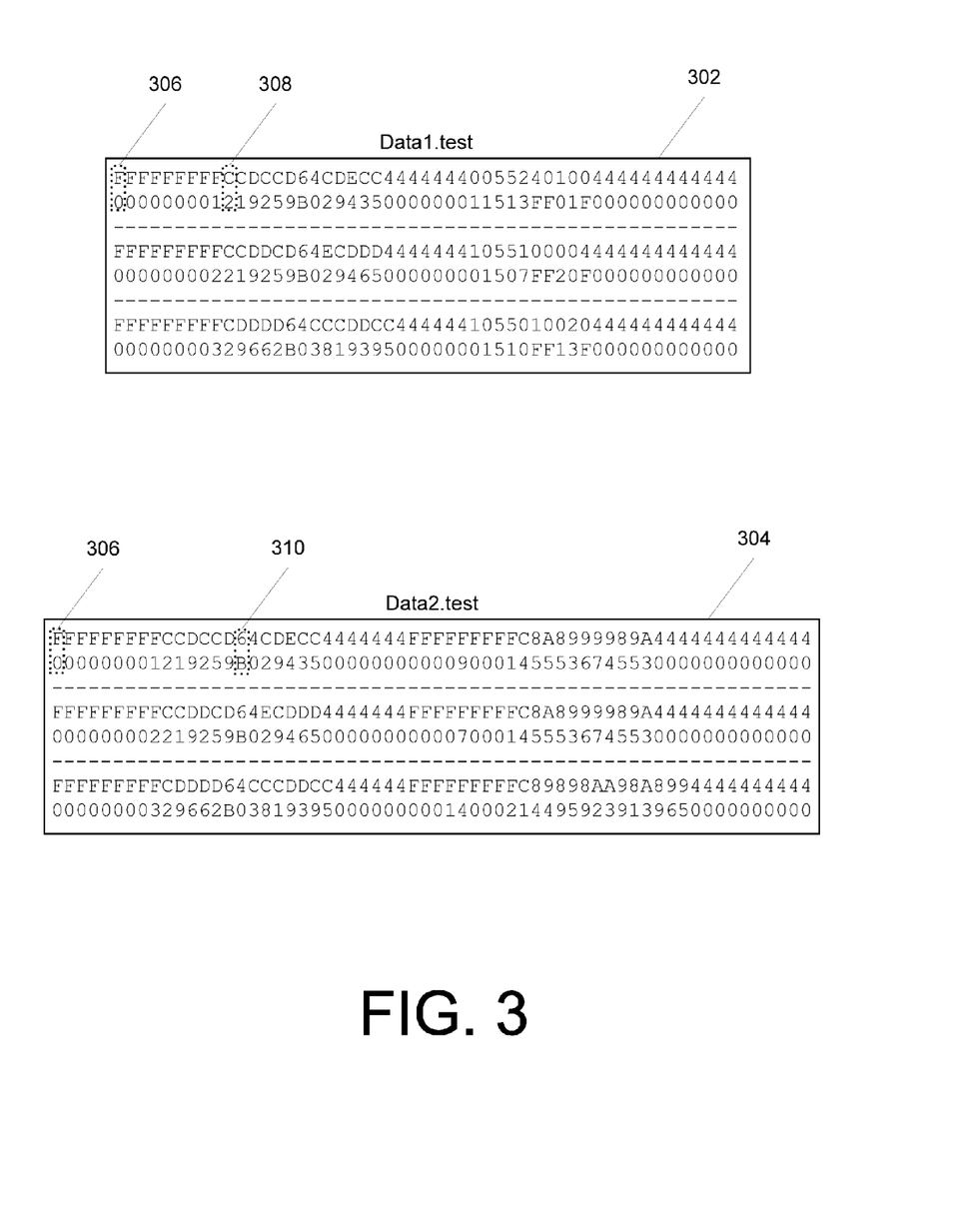
FIG. 3 illustrates, in simplified form, examples of two rudimentary example data-containing structures.

FIG. 3 illustrates, in simplified form, examples of two rudimentary example data-containing structures 302, 304, respectively named "Data1.test" and "Data2.test," that could each be data-containing structures 110 as described herein. Each example structure 302, 304 contains data which, as shown, is represented in hexadecimal (hex) form that is read as vertical pairs of characters. By way of example, the first character 306 (noted by dotted lines) in both example structures 302, 304 is "F0" in hex, and a later character 308 (noted by dotted lines) in the first example structure 302 is "C2" in hex and a later character 310 (noted by dotted lines) in the second example structure 302 is "6B" in hex. As should be appreciated, absent reference to some corresponding format defining data structure 112, there is no way to discern from purely looking at the content of either example data-containing structure 302, 304 where any particular data item begins or ends, let alone each file's contents.

Figure 4:
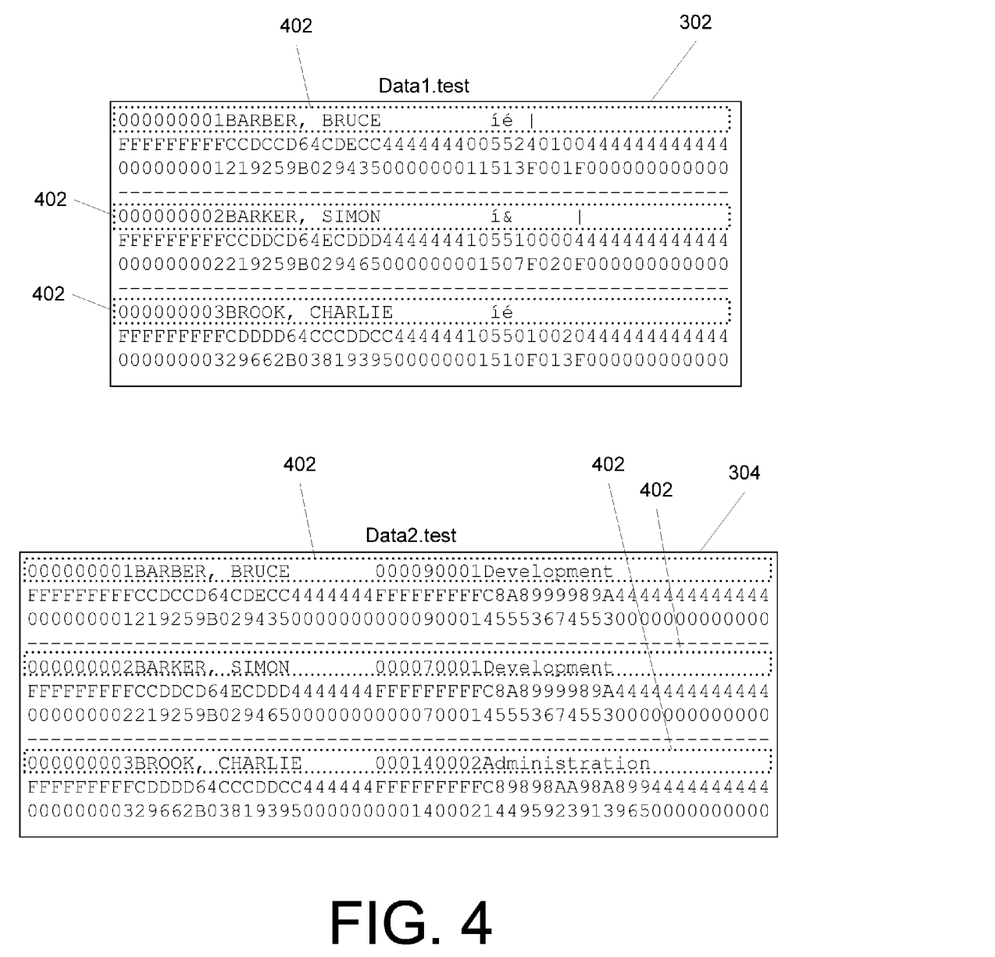
FIG. 4 illustrates, in simplified form, the example data-containing structures of FIG. 3, but further shows what the data content would actually be if it was accessed using the proper associated format defining data structure.

FIG. 4 illustrates, in simplified form, the example data-containing structures 302, 304 of FIG. 3, but further shows (within the dotted boxes 402, and purely for purposes of understanding) what the data content would actually be if it was accessed using the proper associated format defining data structure 112.

With the above in mind, the system's matching of data-containing structures 110 and format defining data structures 112 will now be discussed. Note here that, most implementations will perform the matching in a many-to-many fashion and the matching approach described herein is essentially agnostic, on an individual basis, as to whether it is used to find any format defining data structures 112 that correspond to a particular data-containing structure 110 or any data-containing structures 110 that can be accessed using a particular format defining data structure 112.

The matching of data-containing structures 110 and format defining data structures 112 is performed as an automated process, by one or more of the processors 104 executing a program made up of instructions stored in the non-volatile program storage 106. The instructions include a set of validation rules that will be used to perform the matching. The validation rules incorporate a deep understanding of the different data types used by business applications and the kinds of exceptional data that are typical in most organizations files. As such, they can be used to cull candidate files to reduce the number of files that need to be analyzed and can be used to determine the likelihood of a match between particular format defining data structures 112 and data-containing structures 110. The validation rules will typically include rules relating to basic compatibility between the format defining data structures 112 and data-containing structures 110. For example, data-containing structures 110 can contain fixed or variable length records. Since a minimum/maximum record length can be obtained through compiling or parsing a format defining data structure 112, and the file system will maintain a notation of the record lengths in its stored data-containing structures 110, that information can be used to select a group of candidate format defining data structures 112 that should be analyzed for a given data-containing structure 110 or can be used to exclude certain data-containing structures 110 because a format defining data structure 112 can never be a proper match with a data-containing structure 110 if the record lengths in the data-containing structure 110 are less than the minimum record length of a format defining data structure 112 for fixed length records or less than the minimum record length for variable length records.

For example, through compilation, parsing or other known approaches, information for a given format defining data structure 112 can be determined regarding the start position of each data item, the data type of the data item, and the physical length of the data item.

Once the candidate groups have been identified, the actual content analysis begins.

In overview, the matching analysis involves comparing each candidate format defining data structure 112 against every record in each data-containing structure 110 to determine, via a combination of record and aggregate ranking, which candidate format defining data structure 112 represents the best description of what's in the data-containing structure 110 and, thus, allows for the determination of the best format defining data structure 112 to use to access that data-containing structure 110 for further content analysis, discovery, or other application purposes of the organization not germane to understanding the invention.

Specifically, the matching analysis uses record and aggregate ranking numbers to identify a best match such that, for example, a value of "1" for record level analysis implies a complete match, and fractional values identify the amount of divergence from a complete match, a value of 1 for a file level aggregate analysis implies that the format defining data structure 112 can be used to access every record in the file, while larger values indicate the amount of records that cannot be successfully accessed using that particular format defining data structure 112.

More particularly, the comparison process uses the formatting rules for different kinds of data types and determines how closely the contents of the records within a data-containing structure 110 matches the data definitions found in a candidate format defining data structure 112. Specifically, the process uses three record level metrics and three file level metrics to determine how closely a data-containing structure 110 matches the data definitions found in a candidate format defining data structure 112.

Record Level Metrics

There are three record level metrics that are used in the analysis:

"Record consistency value" which is calculated as the number of valid data items in the data-containing structure 110 divided by the number of packed decimal, zoned decimal, graphic data items, and other items with strong signatures in a candidate format defining data structure 112. This value thus is a fraction that identifies how closely the content of the two structures 110, 112 match, with a "1" value being a perfect match. Since this value only uses data types with "strong" signatures, it provides a relatively unambiguous indication as to whether the content and format match.

"Record uninitialized data value" which is calculated as the number of valid data items (taking into account data initialization rules) in the data-containing structure 110 divided by the number of packed decimal, zoned decimal, graphic data items and other items with strong signatures in a candidate format defining data structure 112. This value is similar to the "record consistency value" except that it recognizes that, although it also uses "strong" data types, a given data-containing structure 110 may have values that should have been initialized to a standard value but may not have been, so they contain "junk" (i.e., invalid) information that will make an otherwise potentially good match appear to be a worse match than it actually is. Thus, it is based upon the assumption that certain invalid values may be attributed to poor programming practices with respect to initialization and not a lack of correspondence between content and format.

"Record match value" which is calculated as the number of data items with "good" values (in the sense that they have proper type, size and content) divided by the number of data items analyzed. This value is a modification of the uninitialized data value but additionally incorporates more advanced analysis for other more "ambiguous" data types (i.e., that don't have such strong signatures) to thereby provide a more subjective determination regarding a match between content and format.

Once the record level values are calculated they are then used to calculate the file level metrics.

File Level Metrics

The file level metrics aggregate the record level metrics for all the analyzed comparisons of content in an individual format defining data structure 112 and individual data-containing structure 110 and give a picture of how closely, in toto, an individual format defining data structure 112 and individual data-containing structure 110 match.

The file level metrics are:

"File consistency value" which is calculated as ((the number of records in the analyzed data-containing structure 110) minus (the sum of the record level "record consistency values"))+1.

"Uninitialized data adjustment value" which is calculated as ((the number of records in the analyzed data-containing structure 110) minus (the sum of the record level "record uninitialized data values"))+1.

"File match value" which is calculated as ((the number of records in the analyzed data-containing structure 110) minus (the sum of the record level "record match values"))+1.

Advantageously, at the file level, a hierarchical approach can be used, such that, the file consistency value can be calculated and, if equal, or very close, to a "1" value, the file level analysis can stop because there is a likely close match between the individual format defining data structure 112 and individual data-containing structure 110. However, if the file consistency value is in some ambiguous range that does not clearly indicate a good match or a clear lack of a match, then the uninitialized data adjustment value can be used to further take into account that the match might be skewed by uninitialized data content. Finally, if the uninitialized data adjustment value still doesn't provide clarity, then the file match value can be used.

In accordance with the foregoing analysis, it is important to recognize some caveats to the analysis. Since most of the data-containing structure 110 will likely contain some inconsistent data, its probable that, on a record-by-record basis, the analysis process is going to sometimes identify an incorrect format defining data structure 112. However, it is likely in such cases that, given enough samples and data content the analysis is still going to identify one or more format defining data structures 112 that provide a better description of the contents of a given data-containing structure 110 than the others. In such cases, even if the conventional approach must be resorted to the number of involved files will likely be very small, thereby still significantly reducing the time, cost and difficulty of accessing the content.

Of course, it should also be recognized that the analysis process may not be able to identify a match between a particular data-containing structure 110 and candidate format defining data structure 112. Likewise, in the case of data-containing structures 110 without much "structure" (for example, files that are mostly character data items) and/or that only contain a few records, an incorrect format defining data structure 112 may be identified as a match, if one can be found at all.

In addition, it is to be understood that some data types are so infrequently used or have values that are highly random, so their presence can skew the analysis and there is generally no reason to attempt an analysis that directly takes into account such data types.

The following TABLE 1 identifies the different data types and how they are used:

TABLE 1

| Data Type | Description/Usage |
|---|---|
| Packed-Dec | Packed decimal - used to compute record consistency value |
| Disp-Num | Zoned decimal - used to compute record consistency value |
| DBCS | Graphic - used to compute record consistency value |
| Group | Identifies a structure or sub-structure. The assembler/parser data definition identifies the length of the structure and any substructures |

TABLE 1-continued

| Data Type | Description/Usage |
|---|---|
| Display | Character data - used in computing match value for ambiguous data |
| Binary COMP-1 COMP-2 | Binary data - used in computing match value for ambiguous data |

Packed Decimal Validation

Packed decimal data is a numeric data type with a very unique format, so it is considered herein as a "strong" data type. It has a compact representation and large range of precise values (up to 31 digit's). Each byte of a packed decimal value is broken into 2 nibbles (4 bits) and the nibble on the far right contains a sign indicator that identifies the data value as positive (a hex "A" or "C" or "F" value) or negative (a hex "B" or "D" value). Generally, use of hex "C" for positive and hex "D" for negative are preferred and the use of a hex "F" value is a strong indication that zoned decimal data was converted to packed decimal data.

Zoned Decimal Validation

Zoned decimal data is another form of numeric data that is considered herein as a "strong" data type. It is similar to packed decimal but not as compact. Each byte consists of two nibbles, with the first nibble being the zone bits (must have a value between hex "F0" and "F9") and the last zone on the right identifies whether the value is negative (a hex "C0" through "C9" value), positive (a hex "D0" through "D9" value), or unsigned (a hex "F0" through "F9" value).

Double Byte Character Set (DBCS) Validation

Files that contain Japanese, Korean, or Chinese characters would have those character formats indicated using the DBCS format. There are two forms of DBCS, "mixed mode" which is a combination of single and double byte characters and includes shift codes to identify when the data switches from single to double byte, and purely "double byte mode" data with no shift codes (in COBOL these are identified using PIC G or PIC N clauses). Detection of invalid data for these types is most easily accomplished by trying to convert the double byte data items into UNICODE. If the conversion process reports an error the data item contents can be considered invalid. Note that, for pure DBCS data items, the data needs to be enclosed in "shift-in"/"shift-out" codes before conversion.

With the foregoing in mind, an example of initial validation using the attributes of a data-containing structure 110 and then a format-based analysis using the packed decimal data validation rule will be provided.

Figure 5:
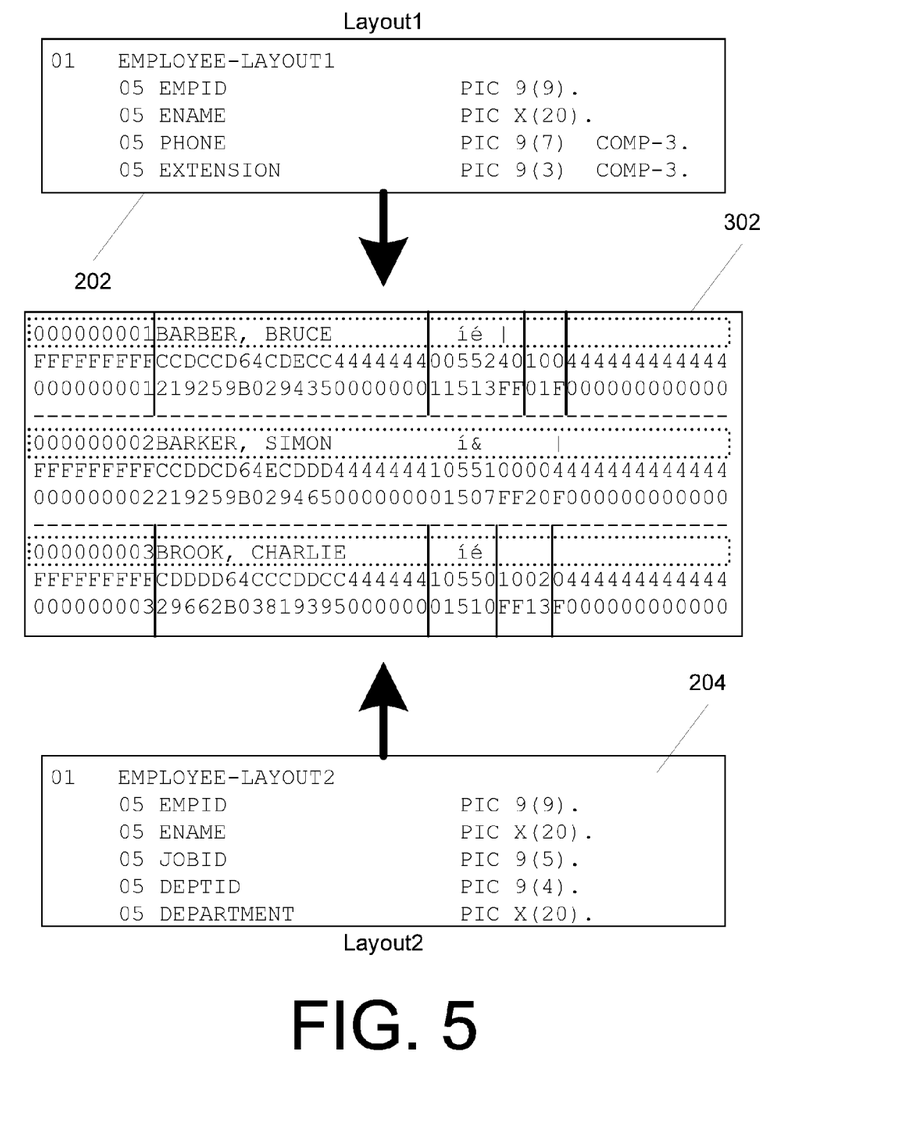
FIG. 5 illustrates, in simplified form, one specific data-containing structure, the "Data1.test" data-containing structure of FIG. 3 and two candidate format defining data structures, the "Layout1" and "Layout2" format defining data structures of FIG. 2.

FIG. 5 illustrates, in simplified form, one specific data-containing structure 110, the "Data1.test" data-containing structure 302 of FIG. 3 and two candidate format defining data structures 112, the "Layout1" and "Layout2" format defining data structures 202, 204 of FIG. 2.

For simplicity, the approach is illustrated using only one data-containing structure 110 and two format defining data structures 112 with the understanding that the approach would essentially be the same for a larger number of files.

According to the validation approach described herein, initially, a data containing structure 110 is analyzed using one or more rules from a set of validation rules to identify a set of potential candidate format defining data structures 112 that potentially correspond to the data-containing structure 110. For example, one validation rule that can be used is an attribute-based validation rule that relies upon the fact that the file system maintains attributes about the maximum record length in each data-containing structure 110. Likewise, one can readily determine from each format defining data structure 112 what the record length will be based upon the descriptors it contains. Thus, irrespective of actual record content, the record descriptors of a format defining data structure 112 can never be larger than the record length in a data-containing structure 110. By way of example, if the file system indicates that a particular data-containing structure 110 includes records of 80 bytes, all format defining data structures 112 that define records that are greater than 80 bytes can never be a match, and so those format defining data structures 112 can immediately be excluded from any analysis relative to that particular data-containing structure 110.

Of course, other types of attribute-based validation rules can be created and employed for different implementations, for example, based upon the implementer's knowledge of certain organization-specific aspects of the format defining data structures 112 and data-containing structure 110 that can be accessed or have been maintained.

For purposes of this example, notwithstanding the attribute analysis, presume that the "Layout1" and "Layout2" format defining data structures 202, 204 of FIG. 2 have been identified as the only candidates for the data containing structure 302.

According to the "Layout1" format defining data structure 202 of FIG. 5, the "PHONE" data item and "EXTENSION" data item are both "COMP-3" data types, meaning that they are packed decimal data. As such, the 36th and 39th bytes of each record should be in the range of "0C"-"9C", "0D"-"9D" or "0F"-"9F" and, since US phone numbers and extensions are not typically represented as signed numbers, those bytes should have values in the range of "0F"-"9F" to be valid, and the values in between should all be numeric values in the range of "0" to "9". Looking at those values, they are valid for all three records.

According to the "Layout2" format defining data structure 204 of FIG. 5, the "EMPID" data item, "JOBID" data item and "DEPTID" data item are all zoned decimal data items, so their first byte must be in the range of "F0"-"F9" and their last byte must be in the range of "C0"-"C9", "D0"-"D9" or "F0"-"F9" to be valid. Thus, based upon the "EMPID" data item looking at the 1st and 9th bytes of (for clarity, using the third record instead of the first record, although that boundary would not be known) the record, the 1st byte is valid, as is the 9th byte. Examining the potential "JOBID" data item, the 30th and 34th bytes respectively contain hex "10" and "00" so those values are invalid. Likewise, examining the potential "DEPTID" data item, the 35th and 39th bytes respectively contain hex "1F" and "23" so they are not valid either.

As a result, the record level and file level consistency values indicate directly indicate that the "Layout1" format defining data structure 202 of FIG. 5 is the best match for that data containing structure 302.

For larger sets of files, one would do all of the appropriate strong data type (e.g., packed decimal, zoned decimal, DBCS, etc.) analyses and then calculate the record level metrics and file level metrics for each and, potentially, based upon just that analysis, potentially identify matches between at least one of the data-containing structures 110 and a format defining data structure 112.

As noted above, in some cases, uninitialized data can sometimes interfere with the analysis because, although a data item in a record should be initialized to reflect that data type, in some cases, an application may not have actually initialized those type data items. As such, advantageously, performing uninitialized data analysis can reveal that is the case.

For uninitialized data analysis, it is recognized that, in proper practice, applications typically initialize a structure to some default value. Depending upon the particular case, the initialization values should be either spaces (hex "40"), low values (hex "00") or high values (hex "FF"). With the uninitialized data analysis if the packed decimal or zoned decimal analysis looks at all byte(s) and finds that it matches one of those values, rather than treating the value as invalid, the fact that it is invalid will be ignored and the value of the data contents will be treated as "NULL" values (i.e., they would be considered as being data items that have no data in them).

Figure 6:
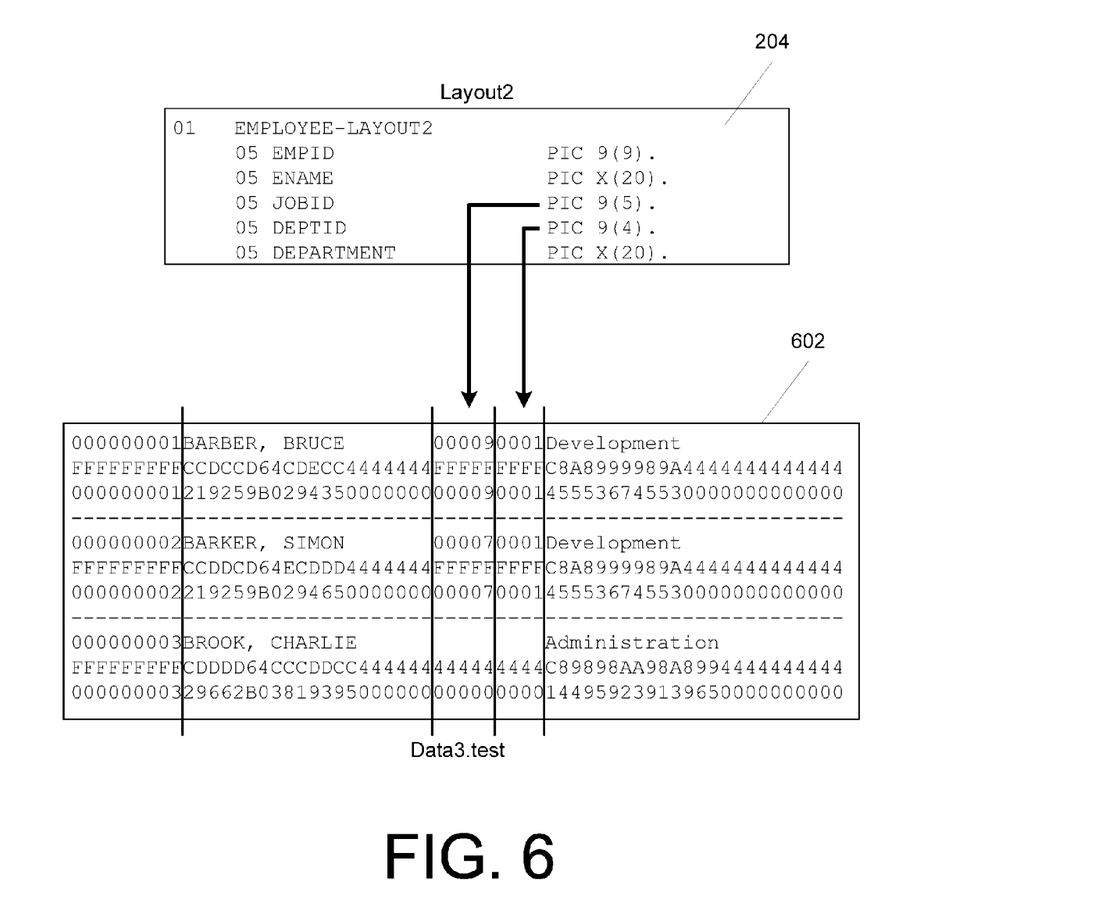
FIG. 6 illustrates, in simplified form a representative uninitialized data analysis.

FIG. 6 illustrates, in simplified form a representative uninitialized data analysis using a format defining data structure 112, specifically the "Layout2" format defining data structure 204 of FIG. 2 and an example data-containing structure 110, a data-containing structure 602 labeled "Data3.test" that is similar to the "Data2.test" file 302 of FIGS. 3 & 4 except that the values in the fields "JOBID" and "DEPTID" are "empty" of numbers.

As shown, the fields "JOBID" and "DEPTID" in the format defining data structure 204 are defined as containing zoned decimal values. In the first and second records (for "Bruce Barber" and "Simon Barker" respectively) those values are valid zoned decimal values because they all begin with hex "F0" and end with values between hex "F0" and "F9". In contrast, those same fields for the third record (for "Charlie Brook") are filled with hex "40" values (which denote spaces). Using the zoned data analysis, those fields in the third record would be considered as invalid. In contrast, using the uninitialized data analysis, those fields would be recognized as merely improperly initialized NULL values (i.e., empty of data) and so, rather than being treated as improper for purposes of assessing whether the "Layout2" format defining data structure 204 is a good match, it will be ignored as being an invalid (i.e., bad) match.

Ambiguous Data Validation

In some cases, a system 100 may contain data-containing structures 110 that do not contain packed or zoned decimal data and/or DBCS data items. Nevertheless, through some more advanced analysis, there are some rules that can be applied to determine whether any such data-containing structures 110 are a good match for a particular candidate format defining data structure 112. These rules feed into the record match value metric. Note here however, that these rules will typically work best when a data-containing structure 110 contains some binary data and they are most likely to be useful to exclude one or more format defining data structures 112 as a match for any data-containing structure 110 that contains predominantly all character data.

As to binary data (i.e., with a data type of "Binary," "COMP-1" or "COMP-2" as in TABLE 1), it is noted that both COBOL and PL/1 support the identification of binary data items that represent 16, 32, or 64-bit numeric values. Generally there is no value that is not valid for a binary data item. However, a binary data item whose contents correspond to printable characters is suspect, especially if most of the binary data records in a data-containing structure 110 exhibit this behavior. While it is true that a binary data item whose contents are spaces could simply be uninitialized, for validation purposes, they will be considered ambiguous.

As to the "Display" data type of TABLE 1, two rules are used.

The first rule is to determine whether the file contains printable characters. This is because most character data items contain printable characters, although it is possible that some contain binary data.

The second rule is that it is not likely that a character data item will start with a space or low value. However, it should be noted that a character data item that is entirely spaces or low values may merely be improperly uninitialized, but they will be considered as ininitialized for validation purposes.

In the above regard, referring back to the data-containing structure 302 of FIG. 4, since the data that follows the first names of "Bruce," "Simon" and "Charlie" are virtually all spaces and unprintable characters. Thus, they are unlikely to be character data.

Repeating Data Validation

There are two types of repeating data that can be defined in a format defining data structure 112, one that defines a fixed number of times the data repeats and one that defines a variable number of repeats that could occur with the data, based upon some control variable.

Figure 7:
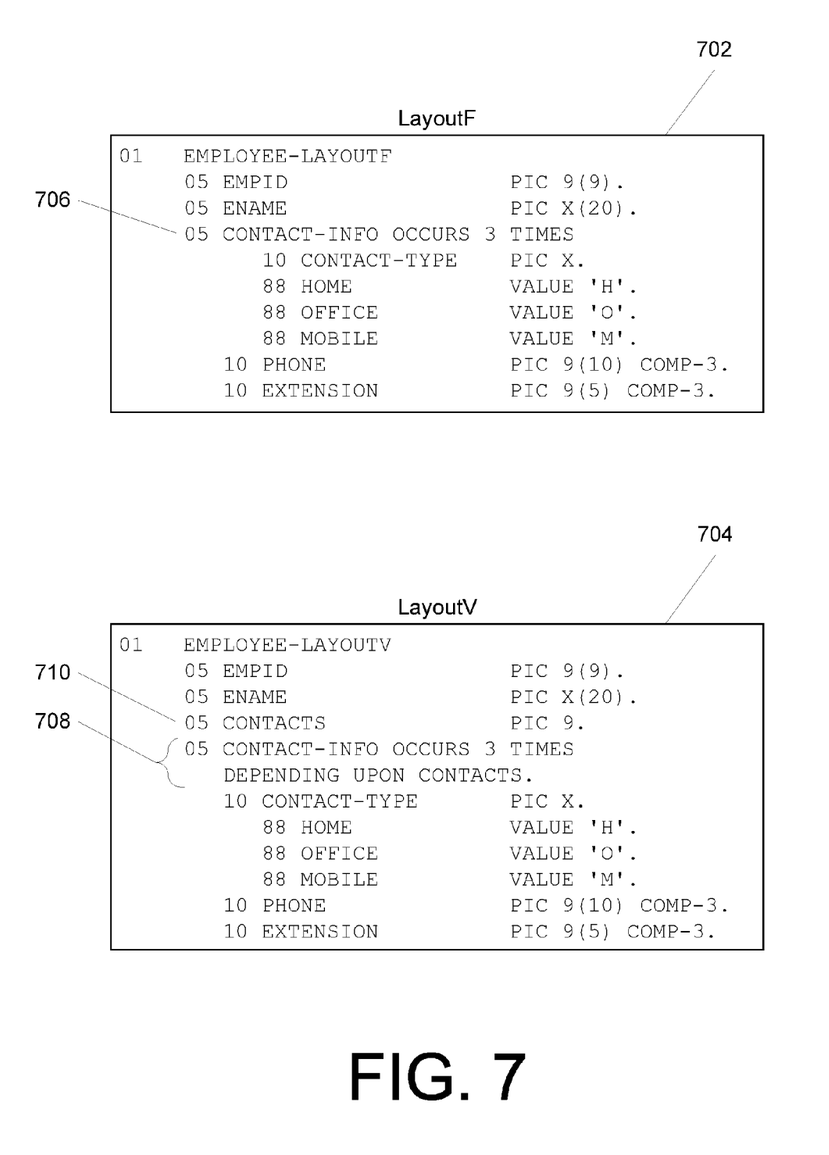
FIG. 7 illustrates, in simplified form, examples of two rudimentary examples of format defining data structures containing repeating data.

FIG. 7 illustrates, in simplified form, examples of two rudimentary examples 702, 704 of format defining data structures 112 containing repeating data, respectively named "LayoutF" 702 and "LayoutV" 704.

As shown in FIG. 7, the CONTACT INFO 706 of the LayoutF format defining data structure 702 must occur 3 times, whereas the CONTACT INFO 708 of the LayoutV format defining data structure 704 is variable, based upon a control variable "CONTACTS" 710, so its contents can occur up to 3 times.

Thus, for validation, repeating data will go through standard packed/zoned/graphic analysis, uninitialized data and ambiguous data checks using, for fixed repeats, the maximum values of the number of occurrences, and for variable repeats, the controlling variable value. Note that if the control variable is invalid, then the maximum possible count is used and all potential instances are assumed to contain invalid values because, in that situation, computation of a small record consistency value for these kinds of records is desired.

Record Redefines Validation

Often, data-containing structures 110 contain multiple versions of the same record types as a result of nested "redefines" that were specified in the original format defining data structure 112. Such format defining data structures include sub structures and controlling attributes that specify which substructure to use.

Figure 8:
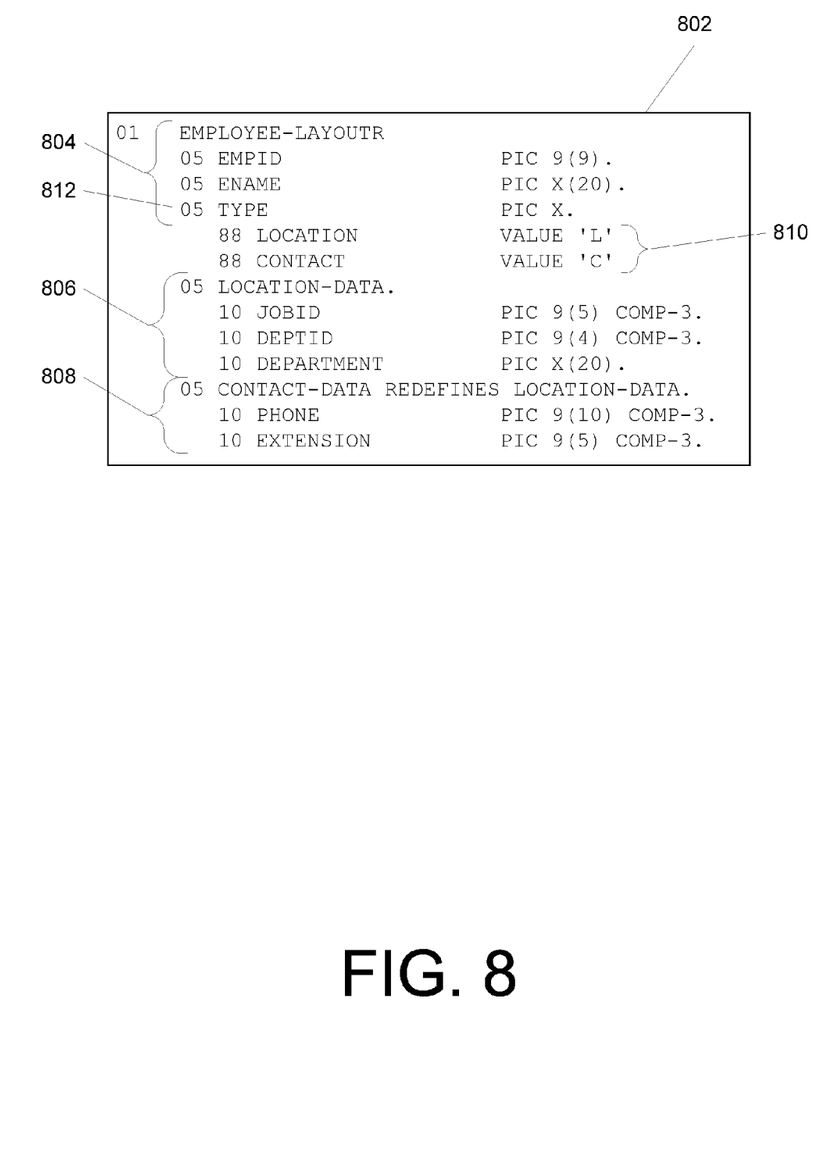
FIG. 8 illustrates, in simplified form, a rudimentary example of a format defining data structure that contains nested redefines.

FIG. 8 illustrates, in simplified form, a rudimentary example 802 of a format defining data structure 112 that contains nested redefines.

As shown, the format defining data structure 802 includes a parent structure 804 and two different defining substructures 806, 808 with the value 810 of 'L' or 'C' specified in the "TYPE" data item 812 specifying, when it appears in a matching data-containing structure 110, which substructure 806, 808 is to be used to access the data.

The way that validation is performed in such a case is that the system performs the validation for each parent and substructure using the same rules for determining record match value(s) for a candidate format defining data structure 112 without redefines. It then computes a record match value for each redefined structure and all parent structures, bearing in mind that, in a nested environment, there could be multiple parent structures. Then, the record match value that is closest to 1 is assumed to describe the records layout. Note here that, in general, one of the data items (generally the controlling data item) in a parent structure can be used to identify when a sub-structure should be used and are typically going to be one or two byte data items. For identification purposes the system 100 will track the values of all parent data items and eliminate those data items that have too many inconsistencies in an attempt to identify the correct controlling data item. Advantageously, this approach to validation also allows for some inconsistency due to a wrong sub-structure being identified from bad or corrupt data.

With the foregoing in mind, an example of the validation matching of the "Data1.test" data-containing structure 302 of FIG. 3 and the format defining data structures 202, 204, 206 of FIG. 2 will now be illustrated with reference to TABLE 2, where the upper row for each record identifies the number of "good" data items and the value below it is the calculated value for that record. The "Total" row contains the sum of the calculated metric values for all of the records.

results are not perfect, doing so may allow an organization to readily identify the importance of the file even if none of the "best" match format defining data structures are a perfect match. Still further, if a given data-containing structure is important and an imperfect, but reasonably good corresponding format defining data structure can be linked, it may be possible to more quickly and easily create a new format defining data structure that properly retrieves the data in the given data-containing structure through straightforward modification and/or additional analysis.

TABLE 2

| Record | Record Consistency Value Metric | | | Record Uninitialized Data Value Metric | | | Record Match Value Metric | | |
|---|---|---|---|---|---|---|---|---|---|
| | Layout1 | Layout2 | Layout3 | Layout1 | Layout2 | Layout3 | Layout1 | Layout2 | Layout3 |
| 1 | 3 | 1 | 1 | 3 | 1 | 1 | 4 | 3 | 2 |
|   | 1 | 0.3 | 1 | 1 | 0.3 | 1 | 1 | 0.6 | 0.5 |
| 2 | 3 | 1 | 1 | 3 | 1 | 1 | 4 | 4 | 2 |
|   | 1 | 0.3 | 1 | 1 | 0.3 | 1 | 1 | 0.6 | 0.5 |
| 3 | 3 | 1 | 1 | 3 | 1 | 1 | 4 | 3 | 2 |
|   | 1 | 0.3 | 1 | 1 | 0.3 | 1 | 1 | 0.6 | 0.5 |
| Total | 3 | 0.9 | 3 | 3 | 0.9 | 3 | 3 | 1.8 | 1.5 |

The record level values are then used to compute the file level values. This is shown below in TABLE 3.

TABLE 3

| Format File | File Consistency Metric | Uninitialized Data Adjustment Metric | File Match Metric | Total Data Items | Packed/Zoned/Graphic Data Items | Match Data Items |
|---|---|---|---|---|---|---|
| Layout1 | (3 − 3) + 1 = 1 | (3 − 3) + 1 = 1 | (3 − 3) + 1 = 1 | 4 | 3 | 4 |
| Layout2 | (3 − 0.9) + 1 = 3.1 | (3 − 0.9) + 1 = 3.1 | (3 − 1.8) + 1 = 2.2 | 5 | 3 | 5 |
| Layout3 | (3 − 3) + 1 = 1 | (3 − 3) + 1 = 1 | (3 − 1.5) + 1 = 2.5 | 4 | 1 | 4 |

The format defining data structures 112 are then ranked according to the file level metric values. Thus, based upon the hierarchy previously noted, according to the file consistency metric, both the Layout1 and Layout3 file have a "1" value, so they both should be ranked higher than the Layout2 file. However, that metric's value is inconclusive, so the uninitialized data adjustment metric is looked to. Again, the values for both Layout1 and Layout3 are the same with a "1" value. Thus, the third level metric of the hierarchy, file match is looked to. With that metric, Layout1 has a value of "1" and Layout3 has a value of "2.5" so Layout1 is ranked higher than Layout 3. Thus, the final ranking would be the "Layout1" format defining data structure first, followed by the "Layout3" format defining data structure second, and then the "Layout3" format defining data structure. Thus, the "Layout1" format defining data structure represents the best match from among those three format defining data structures for the "Data1.test" data-containing structure 302 of FIG. 3.

At this point it should be noted that, in actual implementation and use, matches will likely often not be so clear. Nevertheless, and advantageously, systems constructed and operating as described herein can identify the best candidates and thereby dramatically narrow down the universe of candidate files that a human may need to review. Moreover, in some cases, further analysis may merely involve using the best ranked few format defining data structures to access a given data-containing structure for which they were identified as the "best" match and then viewing the results. Even if the containing structures 110 with potentially corresponding format defining data structures 112 can be significantly reduced.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A computer system for matching format defining data structures with at least one data-containing structure of a group of potentially corresponding data-containing structures, the system comprising:
   at least one processor;
   non-volatile storage accessible by the at least one processor;
   multiple data-containing structures, comprising one of Virtual Storage Access Method (VSAM) data structures or sequential data sets, non-transiently stored within the non-volatile storage having no specifically identifiable corresponding data structures defining formats for properly accessing data contained within the multiple data-containing structures;
   multiple format defining data structures, comprising one or more COBOL copybooks or PL/1 include files having parent structure and at least one substructure, non-transiently stored within the non-volatile storage, the format defining data structures each including metadata definitions for at least one data-containing structure but not specifically identifiable as corresponding to any particular data-containing structure;

program instructions, non-transiently stored within non-volatile program storage, executable by the at least one processor of the computer system, which, when executed, will cause the at least one processor to:

analyze attributes of at least some of the data-containing structures according to a set of validation rules to identify a set of potential candidate format defining data structures for potentially corresponding to the data-containing structures, wherein validation is performed for each parent and substructure using the set of validation rules without redefines;

analyze at least some of the multiple format defining data structures, using record level metrics, the record level metrics comprising record level consistency values, record uninitialized data values and record match values, and using file level metrics, based upon results of the record level metrics, to identify a set of candidate data-containing structures containing data elements having formats substantially corresponding to at least one of the format defining data structures; and rank the set based upon correspondence between one or more of
  i) data types within the set of candidate data-containing structures and data types identified within the at least some of the multiple format defining data structures, or
  ii) values contained within the set of candidate data-containing structures and definitions within the at least some of the multiple format defining data structures,
to obtain a ranked set of candidate data-containing structures that may correspond to at least one of the format defining data structures; and identify at least one of the format defining data structures that is usable to access at least one of the data-containing structures and obtain valid data therefrom.

* * * * *